Figure 1:
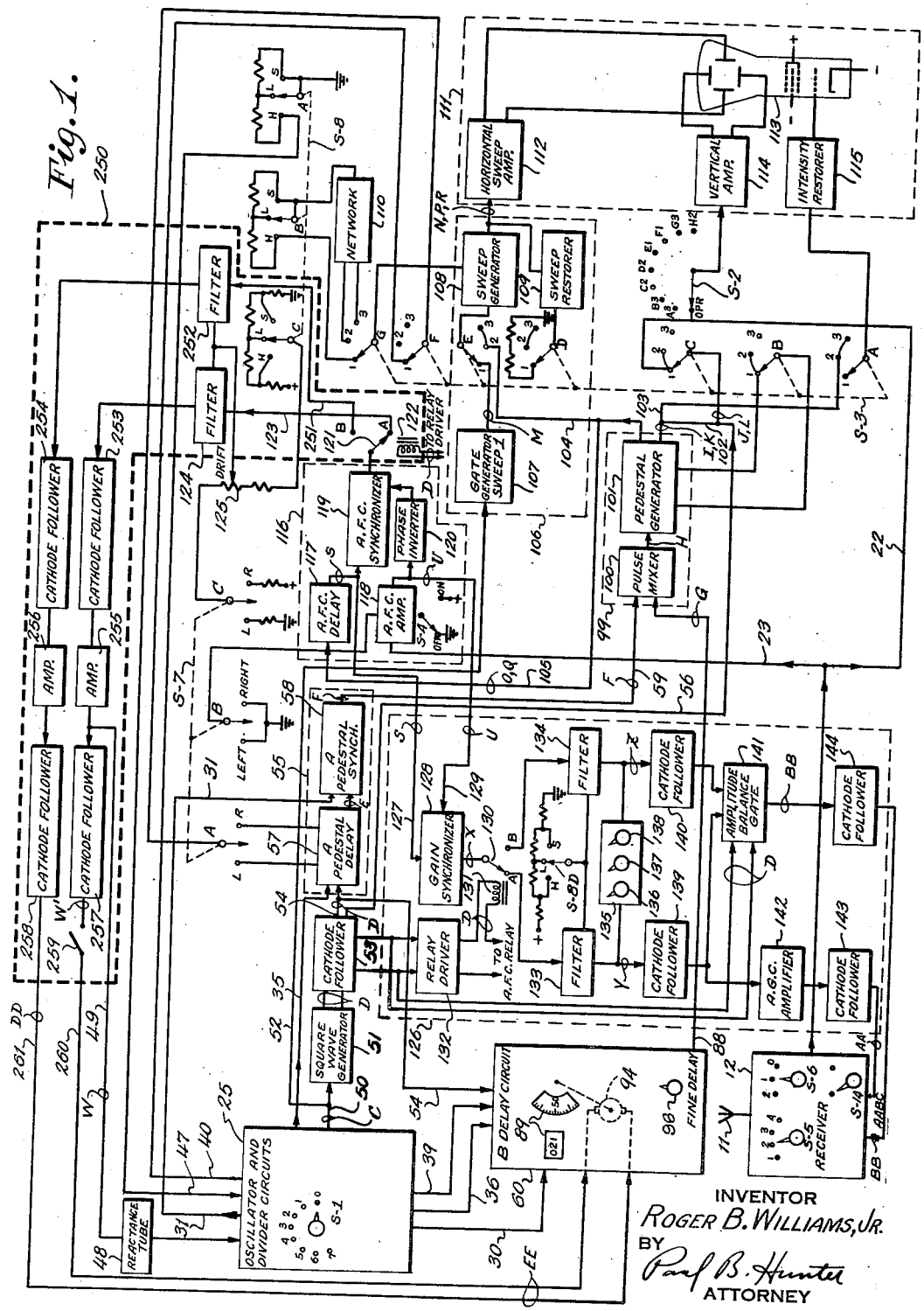

Dec. 14, 1954   R. B. WILLIAMS, JR   2,697,219
AUTOMATIC TIME DIFFERENCE MEASURING CIRCUITS
Filed Jan. 21, 1952                                   5 Sheets-Sheet 2

SLOW SWEEP SPEED

MEDIUM SWEEP SPEED

FAST SWEEP SPEED

INVENTOR
ROGER B. WILLIAMS, JR.
BY
Paul B. Hunter
ATTORNEY

Dec. 14, 1954  R. B. WILLIAMS, JR  2,697,219
AUTOMATIC TIME DIFFERENCE MEASURING CIRCUITS
Filed Jan. 21, 1952  5 Sheets-Sheet 3

INVENTOR
ROGER B. WILLIAMS, JR.
BY
Paul B. Hunter
ATTORNEY

Dec. 14, 1954     R. B. WILLIAMS, JR     2,697,219
AUTOMATIC TIME DIFFERENCE MEASURING CIRCUITS
Filed Jan. 21, 1952     5 Sheets-Sheet 5

INVENTOR
ROGER B. WILLIAMS, JR.
BY
Paul B. Hunter
ATTORNEY

United States Patent Office 2,697,219
Patented Dec. 14, 1954

2,697,219

AUTOMATIC TIME DIFFERENCE MEASURING CIRCUITS

Roger B. Williams, Jr., Locust Valley, N. Y., assignor to The Sperry Corporation, a corporation of Delaware Application January 21, 1952, Serial No. 267,347

9 Claims. (Cl. 343—103)

This invention relates to automatic time difference measuring circuits and to improved automatic time difference measuring circuits usable in hyperbolic navigation receivers.

In a hyperbolic navigation system a pair of spaced ground stations transmit radio signals synchronously in all directions. These signals travel through space with the velocity of light, arriving at a remote receiving station after an elapsed time interval equal to the distance between the ground station and the receiving station divided by the velocity of light. At the receiving station the difference in time between the arrival of a first signal from one of the ground stations and the arrival of the signal from the other ground station is accurately measured. The locus of all points in space at which the time difference interval between arrivals of signals from the spaced ground stations are equal form an imaginary curve expressed mathematically as a spherical hyperbola wherein the foci of the hyperbola are the two spaced ground stations. For each different time difference interval between the arrivals of the signals from the two spaced ground stations there exists a different hyperbola. Over the surface of the earth these different hyperbolas form a family of accurately established lines of position. From other pairs of spaced ground stations at different locations, additional families of hyperbolic lines of position are established. The intersection of a specific hyperbolic line of position from one pair of stations with a specific hyperbolic line of position from another pair of stations establishes a navigational fix.

One well known hyperbolic navigation system is the loran system. In the loran system one ground station, known as the master, transmits periodic "A" pulses of accurately established recurrence intervals, for example 25 pulses per second. The second ground station, known as the slave, transmits periodic "B" pulses of the same recurrence interval as the master pulses but delayed in time. The duration of each of the transmitted A and B pulses is approximately 40 microseconds. The B pulses transmitted from the slave are accurately delayed in time from the A pulses transmitted from the master by an amount equal to the radio travel time from the master to the slave, plus one-half the recurrence interval of the pulses, plus a fixed time delay known as the coding delay. Thus, the time interval from the pulsing of the master to the pulsing of the slave is always greater than one-half the pulse recurrence interval. This pulsing sequence provides a positive identification between received loran A and B pulses. A comprehensive treatment of the loran system may be found in the book "Loran" edited by Pierce, McKenzie, and Woodward and published by the McGraw-Hill Book Co., 1948.

The time difference between the arrival of A and B pulses at a point in space is measured by a receiving apparatus equipped with a cathode-ray indicator and precision timing circuits. One type of loran receiver-indicator, known as the model DBE, is shown and described in the aforesaid book "Loran" on pages 358 through 363.

The services of a trained operator are required to manipulate the numerous controls of a loran navigation receiver-indicator to obtain useful navigational information. The accuracy of the information obtained is dependent upon both the skill and speed of the operator in matching the A and B pulses to obtain a loran reading. Accordingly, the accuracy of loran readings is improved by simplifying and reducing the manual adjustments necessary to match the received A and B pulses and by providing automatic controls whenever possible. Heretofore, the operator in making the final precise match of the expanded A and B pulses on the face of the loran indicator manipulated a manual amplitude balance control to maintain the amplitude of the A and B pulses of equal value, a manual gain control to set the loran pulses at a suitable constant peak value, and a manual variable time delay control to maintain the leading edges of the A and B pulses precisely coincident. Application S. N. 267,441, now Patent 2,651,033, filed concurrently with the instant application in the name of Wilbert P. Frantz, entitled "Automatic Amplitude Balancing Circuits" and assigned to the same assignee as the present invention, describes and claims automatic amplitude balancing and gain control circuits which relieve the operator of two of these manual adjustments, thereby affording an improvement in the ease of operation of the receiver-indicator as well as an increase in the accuracy of the measured time difference intervals.

Patent 2,574,494 in the name of Winslow Palmer, entitled "Timing Apparatus" and assigned to the same assignee as the present invention, describes and claims an automatic synchronizing and time difference interval measuring system that has been found useful in a loran receiver to automatically measure the time difference between the arrival of master and slave pulses. A loran receiver including such automatic time difference interval measuring circuits is described and claimed in application S. N. 80,249, filed March 8, 1949, in the name of Winslow Palmer, entitled "Automatic Loran Receiver" and assigned to the same assignee as the present invention. The present invention is an improvement over these prior systems.

The automatic measurement of time difference between the arrival of a master pulse and the later arrival of a slave pulse as described in the aforesaid application S. N. 80,249 is accomplished in the following general manner. A precision reference pulse timing generator producing recurrent output pulses of duration shorter than the duration of the loran pulses but of substantially the same pulse repetition rate therewith is automatically synchronized with the received master pulses by means of a closed-loop feedback or servo system, the master pulses being distinguished from the slave pulses. A precision calibrated variable delay pulse generator producing recurrent output pulses of duration shorter than the duration of the loran pulses is coupled to the precision reference pulse timing generator such that the time delay interval between the recurrent output pulses from the variable delay pulse generator and the recurrent output pulses from the precision reference pulse timing generator is smoothly adjustable by accurately indicated amounts over a range approximately equal to one-half the loran pulse recurrence interval. The recurrent output pulses from the precision calibrated variable delay pulse generator are automatically synchronized to the received slave pulses by means of a second closed-loop feedback or servo system. The time interval between the arrival of the master pulse and the later arrival of the slave pulse is read from the calibrated dial in the precision calibrated variable delay pulse generator.

The accuracy of the automatic time difference measurement between the arrival of master and slave pulses is a function of the accuracy of the precision calibrated variable delay pulse generator, the capability of the first closed-loop servo system to hold the recurrent output pulses from the precision reference pulse genertor tightly synchronized to a particular portion of the received master pulses, and the capability of the second closed-loop servo system to hold the recurrent output pulses from the precision calibrated variable delay pulse generator tightly synchronized to a corresponding particular portion of the received slave pulses.

Precision calibrated variable delay pulse generators can be designed with very high accuracy in the order of a microsecond of error or less for delays up to 20,000 microseconds. This error is small in comparison to the time difference error due to the difference in synchronization in the two closed-loop servo systems.

The factors that determine the capabilities of a closed-loop servo system to produce an electrical or mechanical control action in response to an electrical stimulus are well understood in the art. Two such factors are the loop gain of the servo system and the signal-to-noise ratio of the electrical stimulus or error control voltage. Generally, the loop gain is designed as high as can be allowed in the face of possible regenerative instability and the signal-to-noise improved whenever possible.

Another factor affecting the accuracy of automatic time difference measurements in loran receivers is the relative difference in amplitudes of received master and slave pulses. The amplitudes of the received master and slave pulses may be made equal in value by an automatic amplitude balancing circuit as described and claimed in the aforesaid copending application S. N. 267,441, now Patent 2,651,033, or correction circuits may be employed of the type disclosed and claimed in application S. N. 117,917, filed September 15, 1949, in the name of Walter N. Dean entitled "Pulse Synchronizer," or in application S. N. 131,684, filed December 7, 1949, in the name of Philip W. Crist entitled "Pulse Synchronizer," the two last named applications also being assigned to the same assignee as the present invention.

As will become apparent hereinafter, the time difference error due to the difference in the synchronization of the precision reference pulse timing generator to the received master pulses and the synchronization of the precision calibrated variable delay generator to the received slave pulses is one of the largest errors in an automatic loran receiver. It is this error which the present invention reduces and thereby improves the accuracy of automatic time difference measurements.

The present invention provides an increased accuracy of synchronization between the precision reference pulse timing generator and the received master pulses and between the precision calibrated variable delay generator and the received slave pulses by providing a synchronizing system in which the precision calibrated variable delay generator is automatically synchronized to that particular portion of the received slave pulses corresponding to the particular portion of the received master pulses to which the precision reference pulse timing generator is synchronized. This desired synchronization is accomplished in the present invention by operating the second closed-loop servo system with a modified error control voltage which is derived by taking the difference between the error control voltage of the first closed-loop servo system and the error control voltage which heretofore has been employed in the second closed-loop servo system.

A further improvement in the accuracy of the automatic time difference is provided in the present invention by operating the second closed-loop servo system such that the precision calibrated variable delay generator is synchronized to that particular portion of a differentiated version of the received slave pulses corresponding to the particular portion of a differentiated version of the received master pulses in the first closed-loop servo system to which the precision reference pulse timing generator is synchronized. By employing differentiated versions of the received master and slave pulses in the first and second closed-loop servo systems respectively, it is possible to synchronize the precision reference pulse timing generator and the precision calibrated variable delay generator to the particular portion of the differentiated or bidirectional versions of the received master and slave pulses that pass through zero while varying in polarity from positive to negative. This particular portion of the differentiated master and slave pulses corresponds to the peaks of the received master and slave pulses; and the time position of this particular portion of the differentiated master and slave pulses is substantially independent of the peak amplitudes of the received master and slave pulses. Accordingly, slight variations in the peak amplitudes of the received master and slave pulses have no undesirable effect upon the synchronization of the precision reference pulse timing generator with the differentiated master pulses and the synchronization of the precision calibrated variable delay generator with the differentiated slave pulses.

In accordance with the present invention there is introduced an improved automatic hyperbolic navigation receiver adapted to measure automatically the time difference interval between received master and slave pulses to a high degree of accuracy.

It is a primary object of this invention to provide in loran receivers improved automatic time difference interval measuring circuits to automatically measure with increased accuracy the time difference interval between received A and B pulses.

Another object of this invention is to provide automatic time difference measurements in a loran receiver between differentiated versions of received A and B pulses.

Yet another object of this invention is to improve the signal-to-noise ratio in loran receivers to thereby increase their useful range by providing improved automatic time difference measuring circuits.

Figure 2:
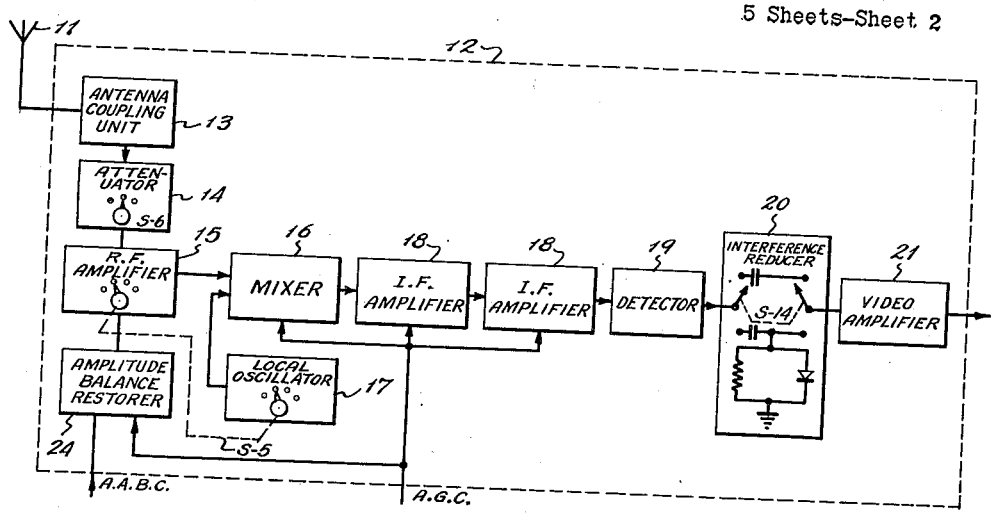
Figure 7A:
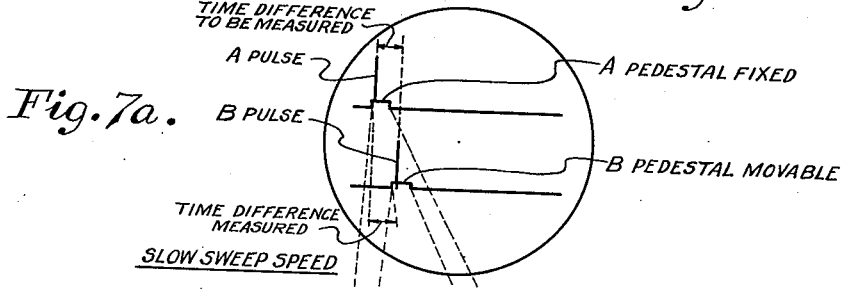
Figure 7B:
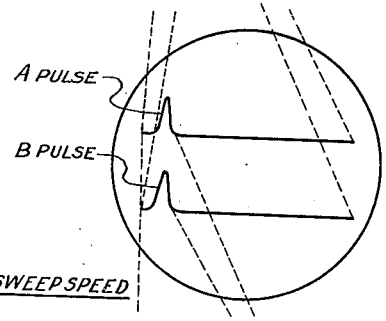
Figure 7C:
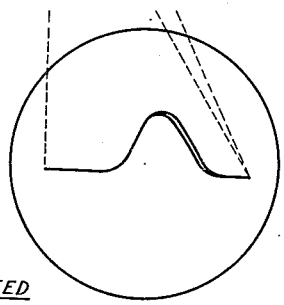
Figure 3:
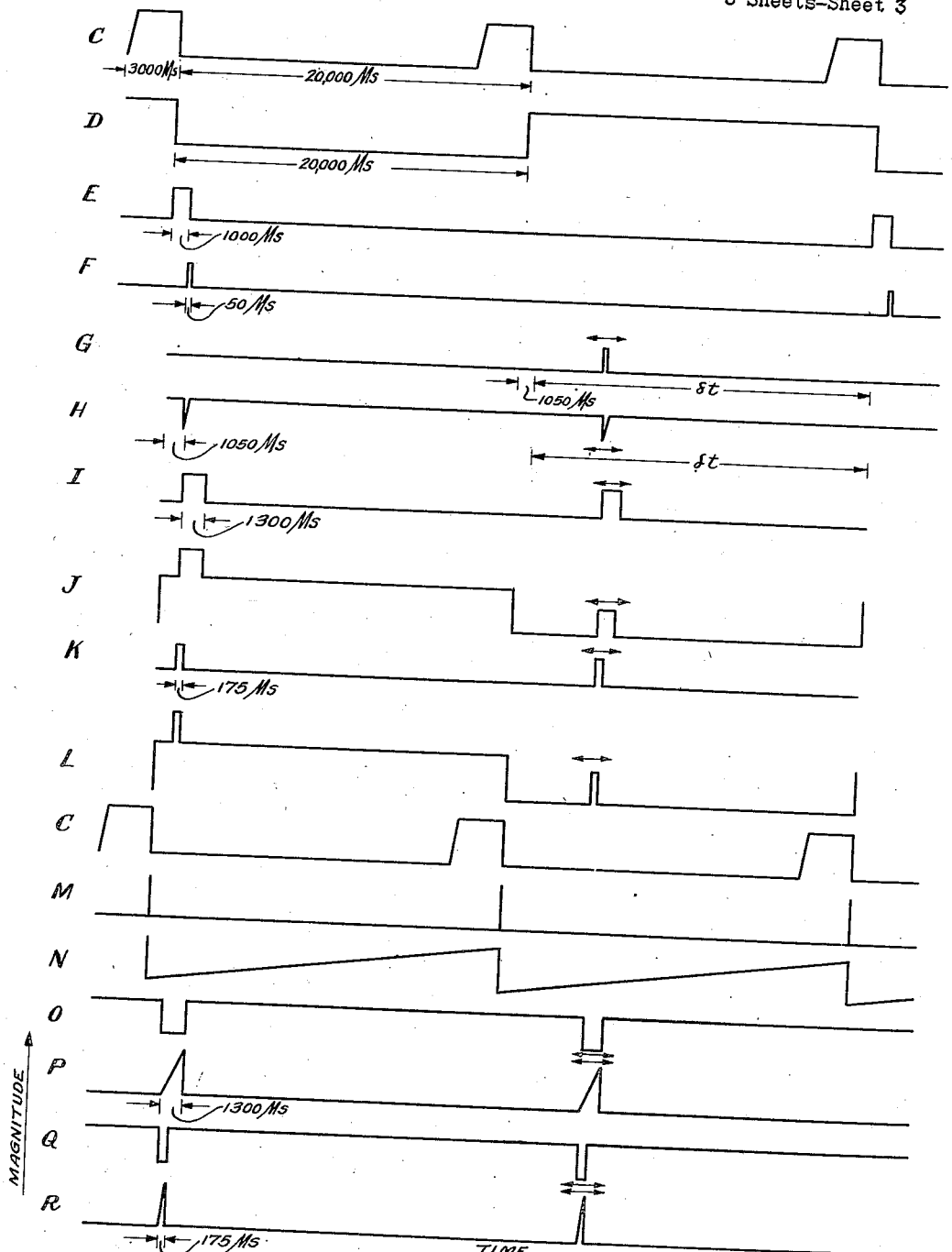
Figure 4:
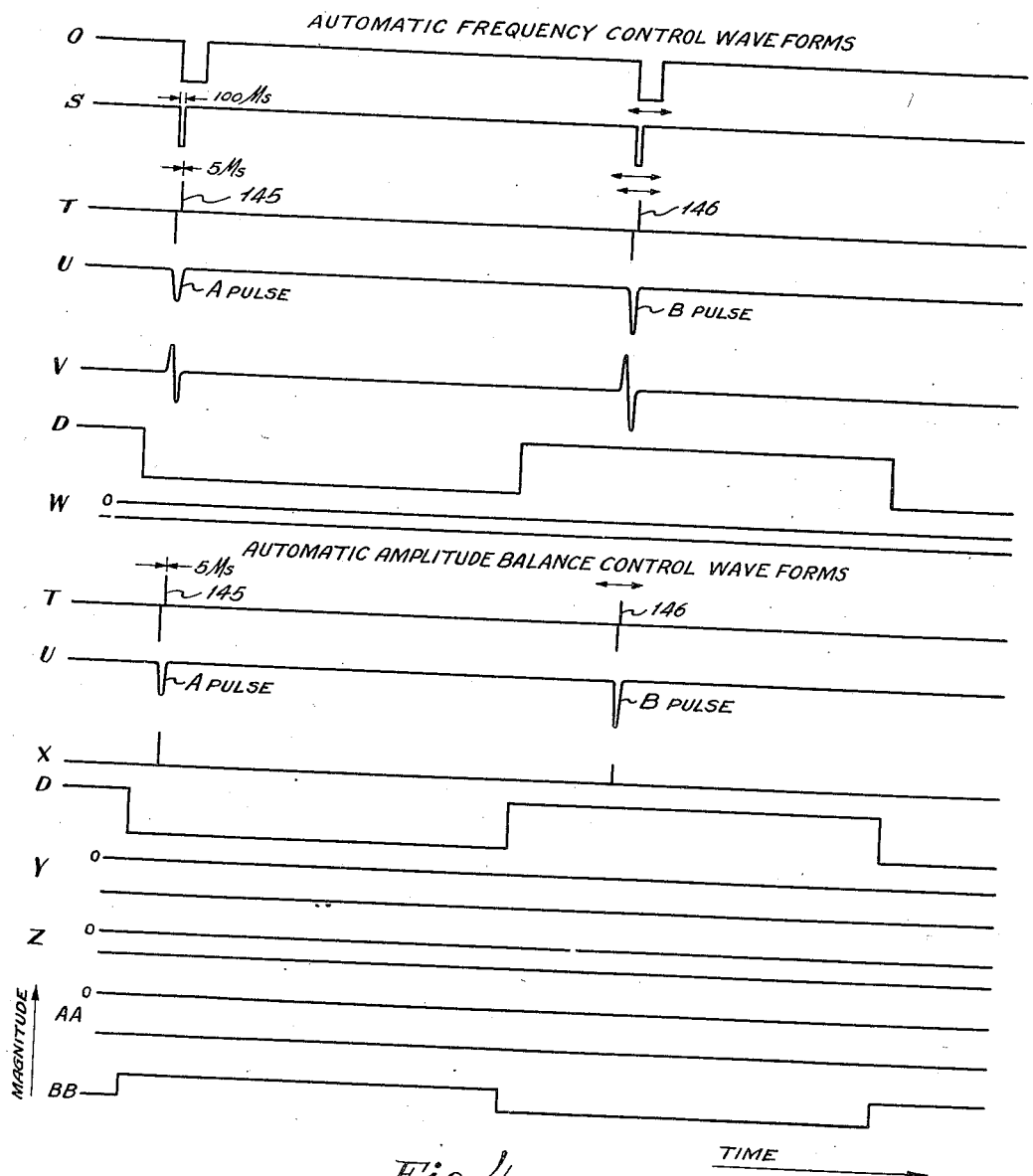
Figure 5:
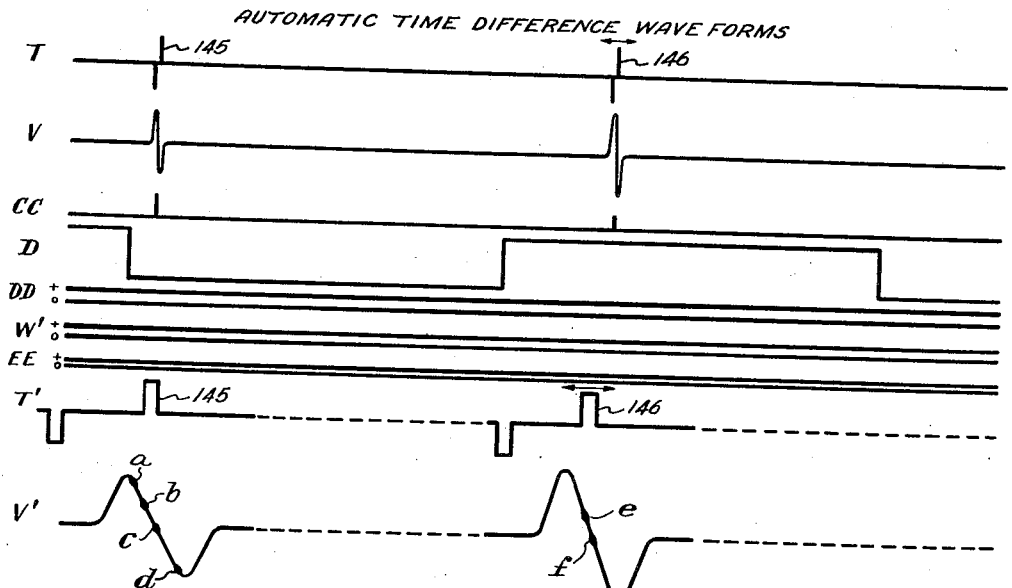
Figure 6:
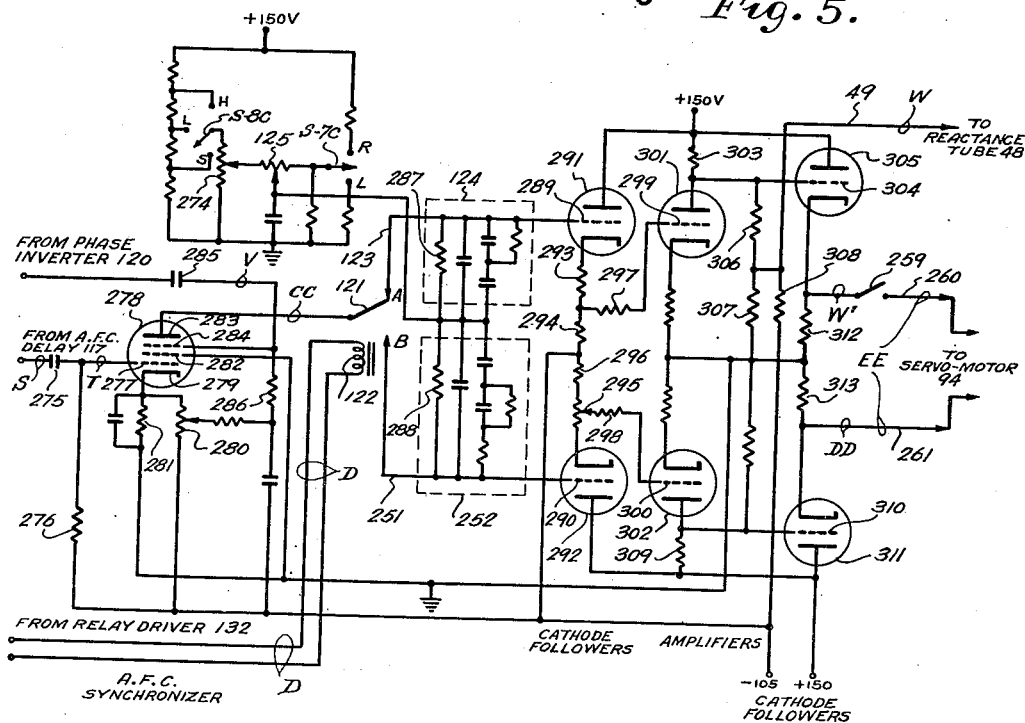

The above brief description and objects of the present invention will be more fully understood and further objects and advantages will become apparent from a careful study of the following detailed description in connection with the drawings wherein, Fig. 1 is a block diagram of a loran receiver-indicator illustrating the automatic time difference measuring circuits of this invention, Fig. 2 is a detailed block diagram of the receiver of Fig. 1, Fig. 3 shows the waveforms of voltages associated with the loran receiver-indicator of Fig. 1, Fig. 4 shows the waveforms of voltages associated with the automatic synchronizing circuits and the automatic amplitude balancing circuits of Fig. 1, Fig. 5 shows the waveforms of voltages associated with the automatic time difference measuring circuits of Fig. 1, Fig. 6 is a schematic diagram of the automatic time difference measuring circuits of the invention, and Figs. 7a, 7b, and 7c are three views of the delineations on the face of the cathode-ray indicator showing the alignment of the loran pulses for three successive sweep speeds.

In the several figures of the drawings, similar reference numerals refer to similar parts. The illustrated waveforms of the voltages or currents associated with the various individual blocks are identified in the block diagrams by capital letters associated with the lead or leads carrying the voltages or currents.

RECEIVER

Referring to Fig. 1, loran A and B pulses from remote master and slave stations are collected by antenna 11 and supplied to the input of superheterodyne receiver 12. Referring particularly to the detailed block diagram of receiver 12 in Fig. 2, antenna coupling unit 13 matches the impedance of antenna 11 to a three-position step attenuator 14 providing fixed amounts of attenuation in steps of 0, 20, and 40 decibels respectively. Radio frequency amplifier 15, mixer 16, and local oscillator 17 are in accordance with conventional superheterodyne practice. Channel switch S–5 selects one of four receiving frequencies within the standard loran band. Conventional I. F. amplifiers 18 and detector 19 amplify and detect the heterodyned loran pulse signals and supply detected negative A and B pulses to interference reducer 20. Interference reducer 20 is a resistance-capacitance differentiating circuit and when switched into operation by S–14 reduces the effect of certain forms of interference, namely continuous wave radio signals. While introducing a characteristic distortion, the interference reducer does not affect the accuracy of time difference measurement since both A and B pulses are distorted in exactly the same manner. Video amplifier 21 supplies positive A and B pulses over lead 22 in Fig. 1 to the operations terminal of test switch S–2 and over lead 23 to the input of the A. F. C. amplifier 118. An automatic gain control voltage is supplied from an A. G. C. circuit, to be described later, to the gain controlling electrodes of the I. F. amplifiers 18 and mixer 16. Amplitude balance restorer 24 supplies an automatic amplitude balancing control voltage to the gain controlling electrode of R. F. amplifier 15. Description of the amplitude balance restorer 24 appears hereinafter in connection with the automatic amplitude balancing circuits.

PRECISION TIMING CIRCUITS

The precision timing circuits comprising the oscillator and divider circuits, the square-wave circuits, the A delay circuits, and the B delay circuits are similar to those described and claimed in application S. N. 633,473, filed December 7, 1945, in the name of Winslow Palmer, entitled "Timing Apparatus" and assigned to the same assignee as the present invention. These circuits are the same as employed in the D. B. E. loran receiver-indicator shown and described in the aforesaid book "Loran."

Oscillator and divider circuits

The conventional oscillator and divider circuits of block 25, Fig. 1, comprise a crystal-controlled oscillator operating at a frequency of 100 kilocycles per second, and a cascade of five frequency dividers, dividing the frequency of the oscillator output voltage in the steps of 5, 4, 5, 5, and 4 respectively, followed by a transient delay circuit. These circuits supply the basic timing voltages of the loran receiver-indicator. The output voltage from the first frequency divider is supplied over lead 30 to one input of the B delay circuits 60 and over lead 31 to one input of the A pedestal synchronizer 58. The output voltage from the third frequency divider is supplied over lead 35 to one input of the A pedestal delay 57 and over lead 36 to a second input of the B delay circuits. The output voltage from the fourth frequency divider is supplied over lead 39 to a third input of the B delay circuits and the output voltage from the transient delay circuit, illustrated as waveform C of Fig. 3, is coupled over lead 50 to the input of the square-wave circuits and over lead 52 to the sweep circuits 106.

The basic pulse repetition rates used in loran are 33⅓, 25 and 20 cycles per second and are identified by the letters H, L, and S. These pulse repetition rates are provided in the oscillator-divider circuits 25 by the basic P. R. R. switch S–8A coupled over lead 40 to the fifth frequency divider. This switch S–8A controls the frequency division of the fifth frequency divider to provide a division of 3 for the rate H, 4 for the rate L, and 5 for the rate S. In addition to the three basic pulse repetition rates H, L, or S, seven additional specific pulse repetition rates identified as 0 through 7 are employed in loran. The specific P. R. R. switch S–1 controls the feedback of pulses from the output of the fifth frequency divider to the inputs of the second and third frequency dividers to provide these specific rates in the oscillator-divider circuits 25.

A reactance tube circuit 48 is coupled to the 100 kilocycle-per-second crystal oscillator and corrects the frequency of this oscillator in response to a negative automatic synchronizing or automatic frequency control voltage supplied over lead 49 from the A. F. C. circuits. A description of these circuits will appear hereinafter.

Square-wave circuits

The positive pulse voltage of waveform C, Fig. 3, from the oscillator-divider circuits energizes square-wave generator 51. This generator 51 is the well-known Eccles-Jordan circuit. Differentiating circuits (not shown) at its two inputs differentiate the positive pulses coupled over lead 50 to produce negative trigger pulses from the trailing or "negative going" edges of the positive pulses. These trigger pulses alternately switch the conduction of plate current between tubes of the Eccles-Jordan circuit in the conventional manner to produce a square-wave output voltage from the circuit, illustrated as waveform D of Fig. 3, whose frequency equals one-half the repetition frequency of the trigger pulses. The frequency of this square-wave voltage corresponds to the pulse repetition rate of the loran signals. The mark and space time intervals of the square-wave voltage are identical and equal to 20,000 microseconds for rate LO. The square-wave voltage is coupled to a push-pull cathode follower 53.

Cathode follower 53 produces push-pull square-wave output voltages, one voltage inverted in phase with respect to the other. One of these square-wave voltages is supplied over lead 54 to the input of the A delay circuits 55 and to the B delay circuits 60. The other square-wave voltage is supplied over lead 56 to the arm of operations switch S–3C. Both of the square-wave voltages are supplied to the amplitude balancing circuit 126. The negative portion of the square-wave voltage over lead 54 energizes the A delay circuits 55 and is eventually synchronized so as to be the time interval during which the A pulses from the master station arrive at the receiver-indicator. The positive portion of the square-wave voltage over lead 54 energizes the B delay circuits 60 and is the time interval during which B pulses from the slave station arrive at the receiver-indicator.

A delay circuits

The A delay circuits 55 comprise A pedestal delay 57 and A pedestal synchronizer 58. The A pedestal delay 57 is an Eccles-Jordan circuit with a differentiating circuit (not shown) at each of its two inputs. The square-wave voltage of waveform D on lead 54 is differentiated by one of the differentiating circuits to produce negative trigger pulses coincident with the trailing or "negative going" edges of the square-wave voltage. These negative trigger pulses initiate the A pedestal delay. The voltage on lead 35 from the third frequency divider with a recurrence interval of 1000 microseconds is differentiated by the other differentiating circuit to produce negative trigger pulses of 1000 microseconds recurrence interval coincident with the trailing edges of the voltage. The A pedestal delay 57 is terminated by the first of the 1000 microsecond negative trigger pulses following the initiation of the A pedestal delay. The output from A pedestal delay 57 is a series of positive pulses of 1000 microseconds' duration illustrated as waveform E in Fig. 3 and whose recurrence interval equals the recurrence interval of the square-wave voltage from cathode follower 53.

Both positive and negative pulses from the A pedestal delay are applied to the "left-right" switch S–7A. The positive pulses are coupled through the "left" position of switch S–7A and through position 1 of switch S–3F to the input of the third frequency divider over lead 47. The function of the positive pulses on lead 47 is to delay the triggering of the third frequency divider by one more of its 200 microsecond input pulses and thus increase the recurrence interval of the output pulses from the fifth divider by 200 microseconds. This increase in recurrence interval eventually results in an increase in the recurrence interval of the sweep voltage applied to the cathode-ray indicator. The sweep recurrence interval when longer than the recurrence interval of the received loran pulses causes the delineated A and B pulses to drift slowly across the face of the indicator to the left.

Negative pulses from the A pedestal delay 57 are coupled through the "right" position of switch S–7A and through position 1 of switch S–3F to lead 47. The negative pulses on lead 47 coupled to the input of the third frequency divider perform the function of pretriggering this divider by one less of its 200 microsecond pulses and thus reduce the recurrence interval of the output pulses from the fifth divider by 200 microseconds. This reduction in recurrence interval eventually results in a reduction in the recurrence interval of the sweep voltage applied to the cathode-ray indicator. A shorter sweep recurrence interval than the recurrence interval of received loran pulses causes the delineated A and B pulses to drift slowly across the face of the indicator to the right. When the "left-right" switch S–7A is in its neutral position, there is no feedback of pulses from the A pedestal delay 57 and consequently there is no drift of the delineated A and B pulses, the sweep recurrence inteval now being equal to the recurrence interval of the received A and B pulses.

The A pedestal synchronizer 58 is also an Eccles-Jordan circuit with a differentiating circuit (not shown) at each of its two input terminals. The positive pulses from the A pedestal delay 57 are differentiated by one of the differentiating circuits to form negative trigger pulses coincident with the trailing edges of the positive pulses. The negative trigger pulses initiate the A pedestal synchronizer 58. The voltage on lead 31 from the first frequency divider, with a recurrence interval of 50 microseconds is differentiated by the other differentiating circuit to produce negative trigger pulses of 50 microseconds recurrence intervals coincident with the trailing edges of the voltage. The A pedestal synchronizer 58 is terminated by the first of the 50 microsecond negative trigger pulses following the initiation of the A pedestal synchronizer. The output from the A pedestal synchronizer is a series of positive pulses of approximately 50 microseconds duration, illustrated as waveform F of Fig. 3, and whose recurrence interval equals the recurrence interval of the square-wave voltage on lead 54. The trailing edges of these output pulses are delayed approximately 1050 microseconds from the trailing edges of the square-wave voltage on lead 54 and the timing of the trailing edges of these output pulses, whose decay time is less than one microsecond, is under the accurate control of the 50 microsecond recurrence interval output pulses on lead 31 from the first frequency divider. The recurrent output pulses from A pedestal synchronizer 58 are coupled over lead 59 to the input of pedestal circuits 99.

*B delay circuits*

The function of the B delay circuits 60 is to produce recurrent variably delayed output pulses of recurrence interval equal to the recurrence interval of the square-wave voltage of waveform D on lead 54 and whose time delay with respect to the recurrent output pulses from the A delay circuits 55 is adjustable by accurately known amounts indicated on a time difference counter 89. The time delay difference between the output pulses from the A delay circuit and the B delay circuit is established with an accuracy better than one microsecond. The recurrent variably delayed output pulses from B delay circuits 60 occur during the time interval that the square-wave voltage on lead 54 is positive. The recurrent output pulses from the A delay circuits occur during the time interval that the square-wave voltage on lead 54 is negative. A fixed time delay exactly equal to one-half the recurrence interval of the square-wave voltage on lead 54 exists between the recurrent pulses from the B delay circuits 60 and the recurrent pulses from the A delay circuits 55 in addition to the variable time delay introduced by the B delay circuits.

The B delay circuits as shown and described in the aforesaid application S. N. 633,473 comprise coarse, medium, and fine phase-shifting channels. The rotations of coarse, medium, and fine phase-shifting transformers in these channels control the time position of the recurrent output pulses from the B delay circuits on lead 88. These variably delayed recurrent pulses of approximately 30 microseconds' duration are illustrated as waveform G of Fig. 3. Three sinusoidal voltages for exciting the three phase-shifting transformers are derived through amplifiers and low-pass filters from the appropriate voltages on the leads 30, 36, and 39 from the frequency dividers in the oscillator-divider circuits 25. The three phase-shifting transformers are coupled through a gear train to time difference counter 89, to fine delay control knob 96, and to servo-motor 94. The gear ratios between each of the three phase-shifting transformers are equal to the ratios of their frequencies and rotation of the gear train under the control of the fine delay knob 96 or the servo-motor 94 produces the same time delay in all three channels. Three phase-shifted sinusoidal voltages from the three phase-shifting transformers are squared and differentiated to yield pulses that terminate three mono-stable or one-shot multivibrator type selector circuits. The first selector is initiated by a positive trigger pulse resulting from the differentiation of the square-wave voltage of waveform D on lead 54. The first selector is terminated, depending on the bias selected by a range extender potentiometer, by the first, second, or third pulse derived from the output of the coarse phase-shifting channel. The time delay provided by the first selector may be varied continuously over the range of approximately 370 to almost 20,000 microseconds under the control of the fine delay knob 96 or servo-motor 94. The time delay so provided, however, is not itself sufficiently accurate for time difference measurements. To obtain the precision required, the selecting process is repeated in two succeeding selectors of greater precision whose output voltages are terminated by output pulses from the medium and fine phase-shifting channels. The second selector is initiated at the termination of the first selector and is terminated by an output pulse from the medium phase-shifting channel. The third selector is initiated at the termination of the second selector and is terminated by an output pulse from the fine phase-shifting channel, having the required precision for accurate time difference measurements. The recurrent variably delayed output pulses of waveform G from the B delay circuits 60 vary in time relative to the leading edges of the square-wave voltage of waveform D on lead 54 smoothly and unambiguously over the range of from 1050 to almost 20,000 microseconds. Moreover, the trailing edges of these variably delayed pulses vary in time relative to the trailing edges of the output pulses from the A pedestal synchronizer 58 on lead 59 smoothly and continuously over the range of exactly 0 to almost 20,000 microseconds plus exactly one-half the recurrence time interval of the received loran A and B pulses.

PEDESTAL CIRCUITS

The pedestal circuit 99 comprises pulse mixer 100 and pedestal generator 101. The positive recurrent output pulses of waveform F, Fig. 3, from the A pedestal synchronizer 58 are supplied over lead 59 to one input of pulse mixer 100. The positive recurrent output pulses of waveform G, Fig. 3, from the B delay circuits 60 are supplied over lead 88 to a second input of the pulse mixer 100. The pulse mixer 100 comprises a pair of grounded-grid amplifier stages with a common anode load resistance. Differentiating circuits (not shown) at each of the two inputs to the pulse mixer 100 produce negative trigger pulses from the trailing edges of the respective positive recurrent pulses. The separate negative trigger pulses are combined across the common load resistance of mixer 100 and supplied to pedestal generator 101. The negative trigger pulses from the mixer 100 appear as in waveform H, Fig. 3.

Pedestal generator 101, a mono-stable or one-shot multivibrator, is triggered on by each negative trigger pulse from mixer 100 and is terminated automatically by its own action as a mono-stable multivibrator. The pedestal generator is provided with two separate outputs, one supplying positive pedestal pulses and the other negative pedestal pulses. These output pedestal pulses are of 1300 microseconds' duration for positions 1 and 2 of operations switch S–3B and of 175 microseconds' duration for position 3. The positive pedestal output pulses are supplied over lead 102 to the arm of operations switch S–3C and also over lead 103 to terminals 2 and 3 of S–3A. These positive pedestal pulses appear as waveforms I and K of Fig. 3. The first or "fixed" pedestal pulse is identified as the A pedestal while the second or "variably delayed" pedestal pulse is identified as the B pedestal. The square-wave voltage from cathode follower 53 appearing on lead 56 is combined with the positive pedestal pulses on lead 102. These combined voltages appear as waveforms J and L of Fig. 3. The negative output pedestal pulses are supplied over lead 104 to terminals 2 and 3 of operations switch S–3E and also over lead 105 to the input of the A. F. C. circuits 116. These negative pedestal pulses appear as waveforms O and Q of Fig. 3.

SWEEP CIRCUITS

Sweep circuits 106 comprise a gate generator 107, a sweep generator 108 producing the slow, medium, and fast sweep-speed voltages, and a sweep restorer 109. A differentiating circuit (not shown) at the input to the gate generator 107 produces negative pulses from the trailing edges of the recurrent output voltage from the oscillator-divider circuits 25 on lead 52. These negative pulses are amplified and inverted by the gate generator 107, a triode amplifier, and supplied to terminal 1 of operations switch S–3E. The positive pulses at terminal 1 appear as waveform M of Fig. 3. These positive pulses are coupled to the input of the sweep generator 108 when the arm of switch S–3E is in position 1 and result in momentary conduction of the conventional triode sweep generator thereby discharging the sweep condenser in parallel with the output of the triode tube. The sawtooth sweep voltage across the condenser, as shown by waveform N of Fig. 3, is applied to the input of horizontal sweep amplifier 112 of the cathode-ray tube circuits 111. With operations switch S–3 in position 2, the sweep generator 108 receives the recurrent negative pedestal pulses on lead 104 from pedestal generator 101. Sweep generator 108 produces a linear, medium sweep-speed voltage coincident with and for the duration of the recurrent negative pedestal pulses. This sweep voltage is illustrated as waveform P of Fig. 3 and the duration of the sweep voltage is 1300 microseconds. With operations switch S–3 in position 3, sweep generator 108 produces a linear, fast sweep-speed voltage coincident with and for the duration of the recurrent negative pedestal pulses. For this position of switch S–3 the sweep voltage is as illustrated by waveform R in Fig. 4 and is of 175 microseconds' duration. Network 110 coupling basic PRR switch S–8B with switch S–3G functions to maintain the amplitudes of the three sweep voltages from sweep generator 108 of constant value for the three basic pulse repetition rates identified as H, L, or S. The sweep restorer 109, a diode D.-C. restorer, is coupled to the input of horizontal sweep amplifier 112 and functions to clamp the lower edges of the three sweep voltages to a reference voltage level. Sweep restorer 109 insures that the cathode-ray trace on the face of the cathode-ray indicator remains centered for each of the three sweep voltages and in addition insures that the horizontal sweep amplifier 112 operates over its linear transfer characteristic for each of the three sweep voltages.

CATHODE-RAY TUBE INDICATOR CIRCUITS

Horizontal sweep amplifier 112, a phase inverter amplifier, supplies push-pull sawtooth sweep voltages to the horizontal deflection plates of cathode-ray tube 113. Vertical amplifier 114, a phase inverter amplifier, receives through the operations position of test switch S–2 the composite voltages comprising the pedestal and square-wave voltages of waveforms J and L of Fig. 3 and the received loran A and B pulses from receiver 12. The vertical amplifier 114 supplies push-pull composite voltages to the vertical deflection plates of cathode-ray tube 113. Intensity restorer 115, a diode D.-C. restorer, functions to blank the cathode-ray trace on the face of the cathode-ray tube 113 during the time intervals between sweeps on positions 2 and 3 of operations switch S–3. Positive pedestal voltages from pedestal generator 101 are supplied through positions 2 and 3 of switch S–3A to the input of the intensity restorer 115. The restorer 115 clamps the upper edges of the positive pedestal pulses to a reference voltage level corresponding to normal intensity of the cathode-ray trace on the face of the cathode-ray tube 113. The lower edges of the pedestal pulses being negative with respect to the upper edges then bias the control-grid of the cathode-ray tube so as to blank the cathode-ray trace. Cathode-ray tube 113 is supplied with suitable beam accelerating and centering voltages not shown. The delineations appearing on the face of the cathode-ray tube 113 during operation of the receiver-indicator are as illustrated by Figs. 7a, 7b, and 7c. An explanation of the operation of the receiver-indicator to produce these delineations will appear hereinafter.

AUTOMATIC FREQUENCY CONTROL CIRCUITS

The automatic frequency control circuits 116 also referred to as automatic synchronization circuits are similar to those described and claimed in application S. N. 74,218, now Patent 2,636,988, filed February 2, 1949, in the name of Winslow Palmer, entitled "Synchronizer" and assigned to the same assignee as the present invention. The A. F. C. circuits 116 comprise A. F. C. delay 117, A. F. C. amplifier 118, A. F. C. synchronizer 119, and a phase inverter 120. Negative pedestal pulses of waveform O or Q on lead 105 from the pedestal generator 101 are supplied to a differentiating circuit (not shown) at the input of the A. F. C. delay 117. Negative trigger pulses resulting from differentiation of the leading edges of the negative pedestal pulses initiate the A. F. C. delay 117, a mono-stable or one-shot multivibrator. The A. F. C. delay is automatically terminated approximately 100 microseconds after initiation by its own internal action as a mono-stable multivibrator. The output from the A. F. C. delay 117 is a series of recurrent negative pulses of 100 microseconds' duration illustrated as waveform S of Fig. 4. These recurrent negative pulses are supplied to a differentiating circuit (not shown) at the first input of A. F. C. synchronizer 119 and also supplied over lead 127 to the automatic amplitude balancing circuits 126. Positive trigger pulses, illustrated as waveform T Fig. 4, resulting from differentiation of the trailing edges of these negative recurrent pulses are applied to the input of the A. F. C. synchronizer 119.

Received positive A and B pulses from receiver 12 are applied over lead 23 to the input of A. F. C. amplifier 118. Switch S–4 places the A. F. C. circuits in operation. The loran pulses are amplified and inverted by amplifier 118 and the output loran pulses appear as waveform U of Fig. 4. The negative output loran pulses are supplied to the phase inverter 120 and also over lead 129 to the automatic amplitude balancing circuits 126. Positive output loran pulses from phase inverter 120 are supplied to a differentiating circuit (not shown) at the second input of the A. F. C. synchronizer 119. The output of the A. F. C. amplifier 118 is grounded by left-right switch S–7B whose arm is coupled over a lead to the A. F. C. amplifier. The A. F. C. operation is thus disabled during the "left" or "right" position of switch S–7 to insure proper operation of the left-right drift circuits.

The differentiating circuit at the second input of the A. F. C. synchronizer 119 supplies differentiated A and B pulses, illustrated by waveform V of Fig. 4, to the second input of A. F. C. synchronizer 119. The A. F. C. synchronizer 119 is a multi-grid pulse coincidence circuit producing recurrent output pulses of current whose amplitude varies according to the relative time position or coincidence between the differentiated A pulse and the particular positive trigger pulse 145 between the differentiated B pulse and the particular positive trigger pulse 146. The output pulses of current from synchronizer 119 are applied to armature 121 of polarized relay 122. The polarized relay 122 is energized by the square-wave voltage of waveform D Fig. 4 which is obtained from the relay driver 132 of the automatic gain balancing circuits 126. The armature 121 vibrates in synchronism with the square-wave voltage of waveform D and separates the output pulses from the A. F. C. synchronizer 119 varying according to the time position of the differentiated A pulses from the output pulses varying according to the time position of the differentiated B pulses. The separated output pulses from A. F. C. synchronizer 119 that are varying according to the relative time position of the differentiated A pulses with respect to the positive trigger pulses 145 are applied over lead 123 to the long-time-constant filter 124 where they are integrated to produce a negative D.-C. control voltage. The negative D.-C. error control voltage is coupled to cathode follower 253. The error control voltage from the cathode follower 253 is amplified and inverted in amplifier 255 and supplied to the reactance tube 48 in the oscillator and divider circuits 25. The negative output D.-C. error control voltage on lead 49, illustrated as waveform W of Fig. 4, biases the reactance tube 48 in order to maintain the frequency of the 100 kilocycle-per-second oscillator 26 such that the positive trigger pulses 145 into the first input of A. F. C. synchronizer 119 are locked in synchronism to the received differentiated A pulses at the second input to A. F. C. synchronizer 119. The aforesaid application S. N. 74,218, now Patent 2,636,988, may be referred to for additional details of this A. F. C. system.

The magnitude of the negative D.-C. error control voltage on lead 49 is under the independent manual control of drift potentiometer 125 and left-right switch S–7C coupled to filter 124. The left-right switch S–7C provides two fixed negative control voltages of different magnitudes from filter 125 for biasing reactance tube 48. In the "left" position of switch S–7C, one of these negative control voltages causes the delineated loran pulses to drift slowly across the face of the cathode-ray tube 113 to the left while in the "right" position the other voltage causes a drift of the delineated pulses to the right. These two voltages are most effective in positions 2 and 3 of operations switch S–3, the left-right switch S–7A being disconnected in these positions of switch S–3F. The drift potentiometer 125 provides an adjustable negative control voltage from filter 124 for slowly drifting the delineated A and B pulses to the right or left. These manual controls facilitate the alignment of the received A and B pulses atop their respective A and B pedestals. Basic PRR switch S–8C coupled to filter 124 provides three separate time constants for the filter corresponding to the three basic pulse repetition rates identified as H, L, or S.

AUTOMATIC AMPLITUDE BALANCING CIRCUITS

The automatic amplitude balance control circuits shown as a block diagram 126 in Fig. 1 are the same as described and claimed in application S. N. 267,441, now Patent 2,651,033, filed concurrently herewith. Referring to the block diagram 126, recurrent negative pulses illustrated as waveform S of Fig. 4 are supplied from A. F. C. delay 117 over lead 127 to a differentiating circuit (not shown) at the first input to gain synchronizer 128. The differentiating circuit produces positive pulses of approximately 5 microseconds' duration, illustrated as waveform T, from the trailing edges of the recurrent negative pulses of waveform S and these positive pulses energize the gain synchronizer. Negative loran A and B pulses, illustrated as waveform U, are supplied from A. F. C. amplifier 118 to the second input of the gain synchronizer 128 over lead 129. The gain synchronizer 128 is a multi-grid pulse coincidence circuit producing recurrent output pulses of current whose amplitude varies according to the relative time position or coincidence between the particular 5 microsecond positive pulse 145 of waveform T and the A pulse and between the particular 5 microsecond positive pulse 146 and the B pulse. The recurrent output pulses of current, also of 5 microseconds' duration, from the gain synchronizer 128 are illustrated as waveform X of Fig. 4. Since the particular positive 5 microsecond pulse 145 has been made to occur at an instant that is coincident with the cross-over of the differentiated A pulse of waveform V by action of the A. F. C. system, it occurs at the instant corresponding to the peak of the A pulse of waveform U. Accordingly, the output pulse of current from the gain synchronizer 128 due to the coincidence of the positive pulse 145 and the A pulse varies according to the peak value of the A pulse. Moreover, the amplitude of this current pulse is inversely proportional to the peak value of the A pulse.

The particular 5 microsecond positive pulse 146 is brought into coincidence with the B pulse to produce an output current pulse from the gain synchronizer by the normal operating procedure of matching the received A and B pulses on the face of the cathode-ray tube 113. The 5 microsecond pulse 146 is derived from the variably-delayed pulse of waveform S and the variably-delayed pulse of waveform S is derived from the B pedestal pulse. Therefore, the 5 microsecond positive pulse 146 is also a variably-delayed pulse. The time position of positive pulse 146 is under the control of the delay knob 96 of the B delay circuits 60. Accordingly, the output current pulse from the gain synchronizer corresponding to the positive pulse 146 varies according to the relative time difference between positive pulse 146 and the B pulse. Moreover, the amplitude of this output current pulse is inversely proportional to the amplitude of the B pulse at the particular instant of the positive pulse 146. With the A and B pulses matched on the face of the cathode-ray tube 113, the relative time position between the positive pulse 146 and the B pulse is such that the positive pulse 146 is coincident with the peak value of the B pulse.

The output of the gain synchronizer 128 is coupled to the armature 130 of polarized relay 131. The winding of polarized relay 131 is energized by the square-wave voltage of waveform D from the relay driver 132. The relay driver 132 is a push-pull power amplifier receiving the square-wave voltage from cathode follower 53. The armature 130 of relay 131 vibrates in synchronism with the square-wave voltage of waveform D to separate into different channels the output current pulses from the gain synchronizer 128 varying according to the amplitude of the A pulses from the output current pulses varying according to the amplitude of the B pulses. The current pulses varying according to the amplitude of the A pulses are supplied to low-pass filter 133 while the current pulses varying according to the amplitude of the B pulses are supplied to low-pass filter 134. Filter 133 integrates its input current pulses to produce a D.-C. output control voltage of waveform Y that varies according to the amplitude of the A pulses and filter 134 integrates its input current pulses to produce a D.-C. output control voltage of waveform Z that varies according to the amplitude of the B pulses.

Switch S–8D coupled to filters 133 and 134 provides three time constants for these filters for the three basic pulse repetition rates H, L, or S and supplies anode voltage to the multi-grid pulse coincidence tube. Control box 135 includes an automatic amplitude balance control on-off switch 136, a manual gain control 137, and a manual amplitude balance control 138 and supplies appropriate control voltages to the input of cathode followers 139 and 140. With the automatic amplitude balance control on-off switch 136 in the on position, the D.-C. output control voltage from filter 133 is applied to the cathode follower 139 and the D.-C. output control voltage from filter 134 is applied to the cathode follower 140. The D.-C. output control voltages from the cathode followers 139 and 140 are applied to separate inputs of amplitude balance gate 141 and the D.-C. control voltage from cathode follower 139 is also applied to A. G. C. amplifier 142. The A. G. C. amplifier 142 amplifies and inverts its D.-C. input control voltage and supplies an A. G. C. voltage through cathode follower 143 to the control-grids of mixer 16 and I. F. amplifiers 18 of receiver 12. This A. G. C. voltage is illustrated as waveform AA in Fig. 4. The A. G. C. voltage adjusts the gain of receiver 12 to maintain the amplitude of the output A pulses of suitable constant value, as the A. G. C. voltage is directly proportional only to the peak amplitude of the A pulses. Variations in the amplitude of the B pulses have no effect on the A. G. C. voltage.

The amplitude balance gate 141 is a balanced modulator comprising a pair of multi-grid tubes receiving two pairs of input voltages. The D.-C. control voltages from the cathode followers 139 and 140 form one pair of input voltages and the push-pull square-wave voltages of waveform D from cathode follower 53 form the other pair of input voltages. The amplitude balance gate 141 produces a square-wave output voltage whose phase is determined by which of its two D.-C. input voltages from cathode followers 139 and 140 is the larger, and whose peak to peak amplitude varies according to the difference between the two D.-C. input voltages. This square-wave output voltage is in phase with either one of the push-pull square-wave voltages into the amplitude balance gate or the other. This square-wave voltage is illustrated as waveform BB of Fig. 4 and is known as the automatic amplitude balance control (A. A. B. C.) voltage.

The A. A. B. C. voltage is supplied through cathode follower 144 to amplitude balance restorer 24, a diode D.-C. restorer, in receiver 12 which clamps the positive edge of the A. A. B. C. voltage to the A. G. C. voltage. As a result, the effect of the A. A. B. C. voltage is to reduce the receiver gain during negative portions of the A. A. B. C. voltage, the reduction in gain being relative to the gain control voltage. The A. G. C. voltage controls receiver gain during the reception of both A and B pulses while the A. A. B. C. voltage controls the receiver gain during the reception of only A pulses or B pulses but not both. For example, when the received B pulses are larger than the received A pulses as is the case in waveform U, the A. G. C. voltage sets the receiver gain such that the A pulses are of suitable constant amplitude as viewed on the face of the cathode-ray tube 113. The A. A. B. C. voltage reduces the receiver gain during reception of the B pulses until the amplitude of the B pulses as viewed on the face of the cathode-ray tube is substantially the same amplitude as the A pulses.

For the case where the received A pulses are larger than the received B pulses, the phase of the A. A. B. C. voltage is reversed and both the A. G. C. voltage and the A. A. B. C. voltage control the gain of the receiver during the reception of the A pulses. The gain of the receiver is reduced during the reception of the A pulses relative to the gain during reception of the B pulses and both A. G. C. and A. A. B. C. voltages set the gain such that the A pulses delineated on the face of the cathode-ray tube are of suitable constant amplitude. The B pulses are amplified more than the A pulses and the additional amount of amplification is such that the delineated A and B pulses appearing on the face of the cathode-ray tube are substantially the same amplitude. In other words, the automatic amplitude balance control action is such that the stronger Loran pulse is always reduced in amplitude without reducing the amplitude of the weaker Loran pulse.

With the automatic amplitude balance control on-off switch 136 in the off position, the D.-C. control voltages from filters 133 and 134 are shunted by the manual gain control voltage and the manual amplitude balance control voltage rendering the D.-C. control voltages from the filter ineffective. The manual gain control 137 controls receiver gain during the reception of both A and B pulses and the manual amplitude balance control 138 controls receiver gain during reception of only A pulses or B pulses but not both.

AUTOMATIC TIME DIFFERENCE MEASURING CIRCUITS

The automatic time difference measuring circuits of this invention are shown as a block diagram 250 in Fig. 1 and also in schematic diagram form in Fig. 6. The A. F. C. circuits previously described form the first closed-loop servo system and synchronize the precision reference pulse timing generator to a differentiated version of the received A pulses. The A. F. C. synchronizer 119 produces recurrent output current pulses, illustrated as waveform CC, Fig. 5, whose amplitude varies according to the relative time position or coincidence between the differentiated A pulse of waveform V and the particular 5 microsecond positive trigger pulse 145 of waveform T and between the differentiated B pulse of waveform V and the particular 5 microsecond positive trigger pulse 146 of waveform T, Fig. 5. These output pulses of current are applied to the armature 121 of polarized relay 122 where they are separated into different channels. The output pulses varying according to the time position of the differentiated A pulses are supplied to filter 124 as described in connection with the A. F. C. circuits.

The output pulses varying according to the time position of the differentiated B pulses are supplied over lead 251 to the long-time-constant filter 252 where they are integrated to produce a negative D.-C. control voltage. This negative control voltage is coupled through cathode follower 254 to amplifier 256 where it is amplified and inverted. The D.-C. output control voltage from amplifier 256 is coupled to the cathode follower 258. The output voltage from cathode follower 258, illustrated as waveform DD, is coupled over lead 261 to one terminal of the servomotor 94 in the B delay circuits 60. The A. F. C. error control voltage of waveform W on lead 49 is coupled to the cathode follower 257. The output voltage from cathode follower 257, illustrated as waveform W', is coupled through switch 259 and over lead 260 to the second terminal of the servomotor 94. The D.-C. error control voltages from the cathode followers 257 and 258 are of the same polarity and the servomotor 94 operates from the difference between these two voltages, this difference voltage being illustrated as waveform EE of Fig. 5. This difference error control voltage energizes the servomotor 94 to vary the time position of the particular 5 microsecond positive pulse 146 relative to the differentiated B pulse, thus completing the second closed-loop servo system.

The particular positive pulse 145 is brought into coincidence with the differentiated A pulse by the normal operating procedure of drifting the A pulse, as viewed on the cathode-ray tube indicator 113 during the slow sweep-speed condition, to ride up on top of the A pedestal. With the A pulse positioned near the left-hand edge of the A pedestal and with the A. F. C. switch S-4 in the on position, the positive pulse 145 is automatically maintained in synchronism with the differentiated A pulse by the A. F. C. system as previously described.

The particular positive pulse 146, whose time position is under the control of servomotor 94 and delay knob 96, is brought into coincidence with the differentiated B pulse by the normal operating procedure of matching the received A and B pulses on the face of the cathode-ray tube 113. With the received A and B pulses matched or approximately matched on the face of the cathode-ray tube and with switch 259 closed, the second closed-loop servo system automatically maintains the A and B pulses matched. Loran numbers may be read from counter 89 at any time thereafter by the navigator as the craft bearing the loran receiver is moved through space without resorting to further manipulations of the controls of the receiver.

The operation of the servomotor 94 in the second closed-loop servo system from the difference between the two error control voltages from the cathode followers 257 and 258 provides the improved automatic time difference measurements obtained with the present invention. This can be explained by referring to the waveforms T' and V' of Fig. 5 which are expanded versions of the waveforms T and V. The particular 5 microsecond positive pulse 145 may be automatically synchronized with the differentiated A pulse such that it is coincident with any of the imaginary points between $a$ and $d$ along the differentiated or bidirectional pulse, as it varies through zero from a positive polarity to a negative polarity, during normal operation of the A. F. C. system. The A. F. C. servo system disclosed in this application is of a type requiring a finite error control voltage to hold synchronism between the differentiated A pulse and the positive pulse 145. As a result, if there is a slight drift of the delineated A pulse atop the A pedestal without A. F. C., with A. F. C. the particular positive pulse 145 will synchronize to the differentiated A pulse so as to be coincident with some imaginary point between $a$ and $d$ but not at point $c$. The faster the drift of the delineated A pulse atop the A pedestal, the larger the error control voltage required to hold synchronization and accordingly, the greater the time position away from the point $c$ to which the particular positive pulse 145 will synchronize. The higher the loop gain in the A. F. C. servo system, the closer the particular positive pulse 145 will be maintained coincident to the imaginary point $c$. The imaginary point $b$ on the differentiated A pulse is an example of one point to which the particular pulse 145 may be maintained coincident for normal A. F. C. operation.

The servomotor 94 energized by the difference between the control voltages from cathode followers 257 and 258 controls the time position of the B pedestal pulse and accordingly controls the time position of the particular positive pulse 146 which is derived from the B pedestal pulse. The second closed-loop servo system including servomotor 94 positions the particular positive pulse 146 relative to the differentiated B pulse such that the error control voltage into the servomotor 94 is zero. This is accomplished by synchronizing the particular positive pulse 146 with the differentiated B pulse such that it is coincident with an imaginary point $e$ along the differentiated pulse, the point $e$ having the same instantaneous amplitude as the imaginary point $b$ of the differentiated A pulse. As a result, the two control voltages from the cathode followers 257 and 258 have the same magnitude and polarity and their difference is zero. Should the A. F. C. system function to synchronize the particular pulse 145 to an imaginary point on the differentiated A pulse different from the point $b$, then the second closed-loop servo system functions to synchronize the particular pulse 146 to a corresponding imaginary point on the differentiated B pulse with the result that the error control voltage to servomotor 94 remains zero. Accordingly, the variably delayed positive pulse 146 is automatically synchronized to that particular portion of the differentiated B pulse corresponding to the particular portion of the differentiated A pulse to which the positive pulse 145 is synchronized.

The present invention provides an increased accuracy in the automatic time difference measurement between received A and B pulses over the prior art systems. This can be illustrated by visualizing a simple modification of the present invention. Should the second closed-loop servo system be modified such that the servomotor 94 is energized solely by an amplified error control voltage from the long-time-constant filter 252, then the second closed-loop servo system would synchronize the particular positive pulse 146 to the imaginary point $f$ on the differentiated B pulse regardless of the position along the differentiated A pulse to which the particular pulse 145 is synchronized. For the example where the particular pulse 145 is synchronized to the imaginary point $a$ or $d$ of the differentiated A pulse and the particular pulse 146 is synchronized to the imaginary point $f$ of the differentiated B pulse, the time difference error is equal to approximately one-fourth of the width of the differentiated loran pulses or 10 microseconds. This is a rather large error in loran time difference measurements. The present invention reduces this type of time difference error to a value less than one microsecond.

It is possible to automatically synchronize the particular positive pulse 145 with the differentiated A pulse such that it is coincident with the imaginary point $c$ and accordingly, the particular positive pulse 146 becomes synchronized so as to be coincident with the imaginary point $f$. This is the preferred synchronization and is accomplished by positioning the delineated A pulse atop the A pedestal and near its left-hand edge without any drifting of the A pulse across the top of the A pedestal in the absence of automatic frequency control. In other words, the particular positive pulse 145 is first manually positioned to be coincident with the imaginary point $c$ by adjustment of the drift potentiometer 125 in the absence of A. F. C. Then with the A. F. C. switched on by switch S-4, the particular positive pulse 145 is thereafter automatically maintained coincident with the point $c$ on the differentiated A pulse. Two advantages are realized by this mode of synchronization. First, the imaginary points $c$ and $f$ of the differentiated A and B pulses respectively, being of zero amplitude, do not change their time position or magnitude should the amplitude of the A and B pulses fluctuate. Accordingly, no time difference errors result from such changes in the amplitude of the A and B pulses. Second, in synchronizing the particular pulse 145 to the zero voltage point, point c, of the differentiated A pulse and in synchronizing the particular pulse 146 to the zero voltage point, point f, of the differentiated B pulse, any random noise disturbances tending to momentarily displace the time positions of the points c and f are averaged to zero in the long-time-constant filters 124 and 252 and are thereby rendered ineffective. This action greatly improves the signal-to-noise ratio in the two closed-loop servo systems enabling them to function properly with extremely weak received A and B pulses. Greater reliability of synchronization is thereby assured with weak loran pulses, thus providing an increase in the useful range of the loran receiver.

Fig. 6 discloses the circuit diagram of the automatic time difference measuring circuits of this invention. The recurrent negative pulses of waveform S from the A. F. C. delay 117 are coupled to the differentiating circuit comprising coupling condenser 275 and resistor 276. The pulses of 5 microseconds' duration of waveform T, Fig. 5, resulting from differentiation of the negative recurrent pulses, are coupled to the control-grid 277 of the multigrid pulse coincidence tube 278. The pulse coincidence tube 278 is cut off in the absence of input pulses to its control-grid. The cathode 279 is at a negative potential with respect to ground determined by the voltage divider comprising potentiometer 280 and cathode resistor 281 coupled between a source of negative potential and ground. The control-grid 277, however, is returned to a more negative potential with respect to ground than cathode 279. The screen-grid 282 is at ground potential. During the occurrence of the 5 microsecond pulses on control-grid 277 the tube 278 conducts and pulses of electrons flow from cathode 279 to anode 283. The amount of the electron flow to the anode is determined by the potential existing on the third grid 284. The bias potential on this grid is negative with respect to the cathode, being determined by the potentiometer 280.

Positive A and B pulses from the phase inverter 120 are coupled to a differentiating circuit comprising coupling condenser 285 and resistor 286. Differentiated A and B pulses of waveform V, Fig. 5, are coupled to the third grid 284 and these differentiated pulses increase or reduce the pulses of electrons that flow in tube 278 when coincident with the 5 microsecond pulses on control-grid 277. The magnitude of the pulses of electrons varies according to the amplitude of the differentiated A and B pulses at the instants of the 5 microsecond pulses.

The output current pulses of waveform CC from anode 283 are separated into channels by the polarized relay 122. The current pulses varying according to the amplitude of the differentiated A pulses flow to armature 121 and over lead 123 and through resistor 287 to the arm of drift potentiometer 125. The current pulses varying according to the amplitude of the differentiated B pulses are switched by the relay 122 to flow over lead 251 and through resistor 288 to the arm of potentiometer 125. The polarized relay 122 is energized by the square-wave voltage of waveform D obtained from the relay driver 132 in the automatic amplitude balancing circuits 126.

The positive potential at the arm of the drift potentiometer 125 is determined by the basic PRR switch S-8C, the potentiometer 274, and the setting of the arm of potentiometer 125. This positive potential is also under the control of left-right switch S-7C. An increase in this positive potential above a predetermined value causes a drift of the delineated loran pulses to the right, while a decrease in value causes a drift of the delineated loran pulses to the left.

Negative 5 microsecond voltage pulses proportional to the amplitude of the current pulses would be produced across resistors 287 and 288 were it not for the integrating action of the condensers in the two long-time-constant filters 124 and 252. This integrating action produces instead a D.-C. control voltage across the resistor 287 varying according to the amplitude of the differentiated A pulses at the instants of the particular pulses 145 and a D.-C. control voltage across the resistor 288 varying according to the amplitude of the differentiated B pulses at the instants of the particular pulses 146. The D.-C. control voltage across resistor 287 is coupled to control-grid 289 of triode tube 291 and the D.-C. control voltage across the resistor 288 is coupled to control-grid 290 of triode tube 292.

The triode tubes 291 and 292 operate as cathode followers and supply D.-C. output control voltage from their respective tapped cathode resistors 293, 294 and 295, 296 through resistors 297 and 298 to the control-grids 299 and 300 of the triode amplifier tubes 301 and 302. The amplified control voltage across anode load resistor 303 is coupled to control-grid 304 of triode cathode follower tube 305 and through the voltage divider comprising resistors 306 and 307 to the reactance tube circuit 48 over lead 49. The D.-C. control voltage on lead 49, previously referred to as the A. F. C. error control voltage, is illustrated as waveform W in Fig. 4. Resistor 308 coupling lead 49 to a source of negative potential determines the average potential on lead 49 in the absence of A. F. C. error control voltage. The amplified control voltage across anode load resistor 309 is coupled to control-grid 310 of triode cathode follower tube 311. The difference between the voltage across cathode resistor 312, illustrated as waveform W', and the voltage across cathode resistor 313, illustrated as waveform DD, is coupled through switch 259 and over leads 260 and 261 to servomotor 94 in the B delay circuits 60. This difference voltage, illustrated as waveform EE, energizes the servomotor 94 to position the geared phase-shifting transformers and the counter 89 in the B delay circuits 60 to automatically maintain the particular pulse 146 synchronized to the differentiated B pulse.

OPERATION OF IMPROVED LORAN RECEIVER-INDICATOR

Having described the improved loran receiver-indicator of this invention, it is believed worth-while to conclude this specification with a more detailed description of the operation of the receiver-indicator to insure a complete understanding of the invention. The receiver-indicator is used in conjunction with a suitable loran charts of the area in which navigational information is required. Referring to Figs. 7a, 7b, and 7c, three illustrations are disclosed of the delineations of the loran A and B pulses as they appear on the face of the cathode-ray indicator 113 corresponding to the three sweep speeds provided in this equipment. The delineations, as appear in Fig. 7a, are obtained in the following manner. With the equipment placed in operating condition and with the automatic time difference switch 259 open, the channel switch S-5 is positioned so as to receive A and B pulses from the most suitable loran master and slave stations in the area. The loran charts are consulted in the selection of these stations. The pulse repetition rate of the chosen loran stations is selected by the basic PRR switch S-8 and the specific PRR switch S-1. Test switch S-2 is set to its operations position while operations switch S-3 is set to position 1. With the automatic amplitude balance control on-off switch 136 in the off position, the amplitude of the delineated A and B pulses is adjusted to a suitable level by the manual gain control 137 and the attenuator S-6. Should interference be received along with the A and B pulses, the interference switch S-14 may be switched on. The A and B pulses appear substantially stationary on the face of the cathode-ray tube in arbitrary positions. To position the A pulse atop of the A pedestal as shown in Fig. 7a, the left-right switch S-7 is positioned to the right or left to drift the pulse appearing upon the upper trace either to the right or left so that it will ride up on top of the A pedestal. With one pulse atop the A pedestal, the second pulse should appear on the lower trace to the right of the A pedestal for correct positioning. In this case, the pulse atop the A pedestal is the A pulse and the pulse on the lower trace is the B pulse. However, should the second pulse also appear on the upper trace, then it is the B pulse which has been drifted to ride up on top of the A pedestal and the positioning of the pulses is incorrect. The left-right switch S-7 must be deflected until the pulses assume the correct position. Since the received B pulses always arrive at the receiver at times greater than one-half the pulse recurrence interval following the A pulses, the above positioning of the pulses provides a positive indentification between the received A and B pulses. Should the A pulse tend to drift slowly off the top of the A pedestal, this drift can be stopped by adjusting the knob of the drift potentiometer 125. Once the A pulse has been positioned atop the A pedestal near its left-hand edge, the A. F. C. switch S-4 is switched on. Automatic synchronization of the sweep voltage in the receiver-indicator to the pulse repetition rate of the received loran pulses is established as previously explained in connection with the A. F. C. circuits and the A pulse remains fixed atop the A pedestal. The slow sweep-speed voltage for position 1 of operations switch S-3 is illustrated as waveform N.

The B pulse on the lower trace is elevated atop the B pedestal by positioning the B pedestal to the right or left with the delay knob 96. The delay knob 96 rotates the geared phase-shifting transformers in the B delay circuits so as to vary the time delay of the B pedestal relative to the A pedestal. The counter 89 geared to the phase-shifting transformers revolves so as to indicate the amount of the time delay difference when the A and B pulses are correctly aligned.

Next, the operations switch S-3 is set to position 2 and the delineated A and B pulses appear as in Fig. 7b. For this position of switch S-3 it may be recalled that the sweep voltage producing the upper trace is initiated coincident with the leading edge of the A pedestal and the sweep voltage producing the lower trace is initiated coincident with the leading edge of the B pedestal. Moreover, the sweep-speed is increased as illustrated by the sweep voltage of the waveform P in order to expand the width of the delineated A and B pulses. For this condition, a change in the time delay of the B pedestal causes the delineated B pulse to be shifted to the right or left across the face of the cathode-ray tube in contrast with position 1 of operation switch S-3 above in which the B pedestal is shifted to the right or left while the B pulse remained stationary. The delay knob 96 is positioned now such that the B pulse on the lower trace appears directly under the A pulse on the upper trace as illustrated in Fig. 7b. The automatic amplitude balance control on-off switch 136 now may be set to its on position to automatically balance the amplitudes of the A and B pulses. Heretofore, the A and B pulses may have been different in amplitude or they may have been approximately balanced in amplitude by the manual amplitude balance control potentiometer 138. Nevertheless, with the automatic amplitude balance control on-off switch 136 in its on position and with the A and B pulses approximately matched, the amplitudes of the delineated A and B pulses hereafter will be automatically balanced to have substantially equal amplitudes.

Next, operations switch S-3 is set to position 3 and the A and B pulses matched as shown in Fig. 7c so that their leading edges are precisely coincident. This final match requires only the adjustment of the delay knob 96. As observed in Fig. 6c, the trace separation voltage obtained from cathode follower 53 has been removed thereby bringing together the traces one upon the other and the sweep speed further increased to expand the witdh of the delineated A and B pulses. The sweep voltage for this condition is illustrated as waveform R. The time difference interval which is the loran number is read directly from the counter 89. This number corresponds to a loran line of position and may be located on the loran charts.

Finally, the automatic time difference switch 259 is closed and the A and B pulses as shown in Fig. 7c are automatically maintained precisely matched. Furthermore, the A and B pulses remain precisely matched thereafter as the loran receiver is moved through space and the navigator may at any time determine the loran number corresponding to a loran line of position by simply taking a reading of the counter 89.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

I claim:

1. In a hyperbolic radio navigation receiver responsive to recurrent A pulses transmitted from a distant master station and to recurrent B pulses transmitted from a distant slave station, each of said recurrent B pulses arriving at the receiver at a time delayed from the arrival of each of corresponding recurrent A pulses; an automatic time difference measuring system comprising, a reference pulse generator producing first output pulses of duration less than the duration of said recurrent A pulses and of repetition frequency approximately equal to the repetition frequency of said recurrent A pulses, a precision time delay circuit coupled to said reference pulse generator and producing second output pulses delayed relative to said first output pulses by indicated amounts of time, the second output pulses from said precision time delay circuit having a duration less than the duration of said recurrent B pulses, said precision time delay circuit including an adjustable time delay control member, a differentiating circuit coupled to the output of said navigation receiver and responsive to said recurrent A and B pulses, a synchronizer coupled to the output of said differentiating circuit for receiving differentiated versions of said recurrent A and B pulses, said synchronizer also coupled to receive the first output pulses from said reference pulse generator and the second output pulses from said precision time delay circuit, said synchronizer producing a first output control voltage responsive to the coincidence between the first output pulses from said reference pulse generator and the differentiated version of said recurrent A pulses and producing a second output control voltage responsive to the coincidence between the second output pulses from said precision time delay circuit and the differentiated version of said recurrent B pulses, means coupling said first output control voltage from said synchronizer to said reference pulse generator to synchronize the first output pulses with the differentiated version of said recurrent A pulses, and control means coupled to said synchronizer and responsive to the difference between the first output control voltage and the second output control voltage for adjusting said time delay control member to establish synchronism between the second output pulses from said precision time delay circuit and the differentiated version of said recurrent B pulses.

2. An automatic time difference measuring system comprising, a source of recurrent A and B pulses whose time difference is to be measured, a reference pulse generator producing first output pulses of repetition frequency approximately equal to the repetition frequency of said recurrent A pulses, a precision time delay circuit coupled to said reference pulse generator and producing second output pulses delayed relative to said first output pulses by indicated amounts of time, said precision time delay circuit including an adjustable time delay control member, a differentiating circuit coupled to said source and responsive to said recurrent A and B pulses, a synchronizing circuit coupled to the output of said differentiating circuit for receiving differentiated versions of said recurrent A and B pulses, said synchronizing circuit also coupled to receive the first output pulses from said reference pulse generator and the second output pulses from said precision time delay circuit, said synchronizing circuit producing a first output control voltage responsive to the coincidence between the first output pulses from said reference pulse generator and the differentiated version of said recurrent A pulses and producing a second output control voltage responsive to the coincidence between the second output pulses from said precision time delay circuit and the differentiated version of said recurrent B pulses, means coupling said first output control voltage from said synchronizing circuit to said reference pulse generator to synchronize said first output pulses with the differentiated version of said recurrent A pulses, and control means coupled to said synchronizing circuit and responsive to the difference between the first output control voltage and the second output control voltage for adjusting said time delay control member to establish synchronism between the second output pulses from said precision time delay circuit and the differentiated version of said recurrent B pulses.

3. Apparatus for timing the interval between periodic reference and delayed pulses comprising a source of periodic reference and delayed pulses, an impulse producing means for producing first impulses of controllable repetition frequency approximately equal to the repetition frequency of said periodic reference pulses, a precision time delay means coupled to said impulse producing means for producing second impulses delayed in time relative to said first impulses by indicated time intervals, said precision time delay means including an adjustable time delay control member, pulse coincidence means coupled to said source of reference and delayed pulses and coupled to receive said first and second impulses, said pulse coincidence means producing a first output control voltage varying according to the coincidence between said reference pulses and said first impulses, said pulse coincidence means further producing a second output control voltage varying according to the coincidence between said delayed pulses and said second impulses, means coupling said first output control voltage from said pulse coincidence means to said impulse means for automatically maintaining the repetition frequency of said first impulses in synchronism with said reference pulses, and control means coupled to said pulse coincidence means and responsive to the difference between said first output control voltage and said second output control voltage for adjusting said time delay control member to automatically maintain said second impulses in synchronism with said delayed pulses.

4. In a hyperbolic radio navigation receiver responsive to recurrent A pulses transmitted from a distant master station and to recurrent B pulses transmitted from a distant slave station, each of said recurrent B pulses arriving at the receiver at a time delayed from the arrival of each of corresponding recurrent A pulses; an automatic time difference measuring system comprising, pulse coincidence means coupled to the output of said navigation receiver, a first closed-loop servo system including said pulse coincidence means and including a reference pulse generator supplying first output pulses of repetition frequency approximately equal to the repetition frequency of said recurrent A pulses to said pulse coincidence means, said pulse coincidence means producing a first output control voltage responsive to the coincidence between the first output pulses from said reference pulse generator and said recurrent A pulses, means coupling said first output control voltage to said reference pulse generator to synchronize said first output pulse with said recurrent A pulses, a second closed-loop servo system including said pulse coincidence means and including a precision variable time delay circuit coupled to said reference pulse generator and supplying second output pulses delaying in time relative to said first output pulses to said pulse coincidence means, said pulse coincidence means producing a second output control voltage responsive to the coincidence between said second output pulses from said precision time delay circuit and said recurrent B pulses, and control means coupled to said pulse coincidence means and responsive to the difference between the first output control voltage and the second output control voltage for varying the time delay in said precision time delay circuit to synchronize the second output pulses with said recurrent B pulses.

5. In an apparatus for automatically measuring the time interval between reference and delayed pulse wave signals comprising a source of reference pulse wave signals and a source of delayed pulse wave signals, a reference pulse generator producing first output impulses of repetition frequency approximately equal to the repetition frequency of said reference pulse wave signals, a first closed-loop servo system including said reference pulse generator and including a pulse coincidence means coupled to said reference pulse generator and to said source of reference pulse wave signals, said pulse coincidence means producing a first output control voltage responsive to the coincidence between the first output impulses from said reference pulse generator and said reference pulse wave signals, means coupling said first output control voltage to said reference pulse generator to synchronize said first output impulses with said reference pulse wave signals, a precision variable time delay circuit coupled to said reference pulse generator and supplying second output impulses delayed in time by known amounts relative to said first output impulses, a second closed-loop servo system including said precision time delay circuit coupled to said pulse coincidence means, said pulse coincidence means coupled to said source of delayed pulse wave signals and producing a second output control voltage responsive to the coincidence between said second output impulses from said precision time delay circuit and said delayed pulse wave signals, and control means coupled to said pulse coincidence means and responsive to the difference between the first output control voltage and the second output control voltage for varying the time delay in said precision variable time delay circuit to synchronize the second output impulses with said delayed pulse wave signals.

6. Apparatus for receiving a reference series of recurrent pulses of a predetermined repetition rate and receiving a series of variably delayed recurrent pulses of substantially the same repetition rate and automatically providing a measure of the time interval between the reference series pulses and the respective variably delayed pulses, comprising recurrent impulse generating means synchronized to said reference series pulses for producing a first series of recurrent impulses of shorter duration than said reference series pulses, means including a variable phase delay circuit coupled to said recurrent impulse generator means for producing a second series of recurrent impulses controllably delayed with respect to said first series of impulses, said second series of impulses being of shorter duration than said received variably delayed pulses, means triggered by said first series of impulses for producing a first output voltage varying according to the strength of said received reference series pulses at the moments of said first series of impulses, means triggered by said second series of impulses for producing a second output voltage varying according to the strength of said received series of variably delayed pulses at the moments of said second series of impulses, and means for varying the delay of said variable phase delay circuit according to the difference between said first and second output voltages.

7. The apparatus as defined in claim 6 wherein said means triggered by said first series of impulses and said means triggered by said second series of impulses comprise a common pulse coincidence circuit with two output circuits alternately switched at the frequency of said received reference series pulses.

8. Apparatus for receiving a reference series of recurrent pulses of a predetermined repetition rate and receiving a series of variably delayed recurrent pulses of substantially the same repetition rate and automatically providing a measure of the time interval between the reference series pulses and the respective variably delayed pulses, comprising differentiating circuit means producing differentiated versions of said reference series pulses and said series of variably delayed recurrent pulses, recurrent impulse generating means synchronized to the differentiated version of said reference series pulses for producing a first series of recurrent impulses of shorter duration than said reference series pulses, means including a variable phase delay circuit coupled to said recurrent impulse generator means for producing a second series of recurrent impulses controllably delayed with respect to said first series of impulses, said second series of impulses being of shorter duration than said received variably delayed pulses, means triggered by said first series of impulses for producing a first output voltage varying according to the strength of said differentiated versions of said reference series pulses at the moments of said first series of impulses, means triggered by said second series of impulses for producing a second output voltage varying according to the strength of said differentiated versions of said series of variably delayed pulses at the moments of said second series of impulses, and means for varying the delay of said variable phase delay circuit according to the difference between said first and second output voltages.

9. Apparatus for receiving a reference series of recurrent pulses of a predetermined repetition rate and receiving a series of variably delayed recurrent pulses of substantially the same repetition rate and automatically providing a measure of the time interval between the reference series pulses and the respective variably delayed pulses, comprising recurrent impulse generating means for producing a first series of recurrent impulses of shorter duration than said reference series pulses, means including a variable phase delay circuit coupled to said recurrent impulse generator means for producing a second series of recurrent impulses controllably delayed with respect to said first series of impulses, said second series of impulses being of shorter duration than said received variably delayed pulses, means triggered by said first series of impulses for producing a first output voltage varying according to the strength of said received reference series pulses at the moments of said first series of impulses, means responsive to said first output voltage and coupled to said recurrent impulse generating means for synchronizing said recurrent impulse generating means to said reference series of pulses, means triggered by said second series of impulses for producing a second output voltage varying according to the strength of said received series of variably delayed pulses at the moments of said second series of impulses, and means for varying the delay of said variable phase delay circuit according to the difference between said first and second output voltages.

References Cited in the file of this patent

UNITED STATES PATENTS

| Number | Name | Date |
|---|---|---|
| 2,497,513 | Paine et al. | Feb. 14, 1950 |
| 2,581,438 | Palmer | Jan. 8, 1952 |